No. 744,959. PATENTED NOV. 24, 1903.
W. DEWAR.
WHEEL.
APPLICATION FILED SEPT. 15, 1902.
NO MODEL.
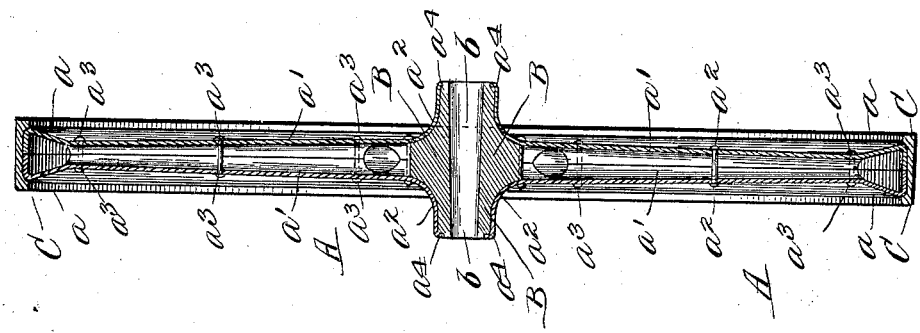
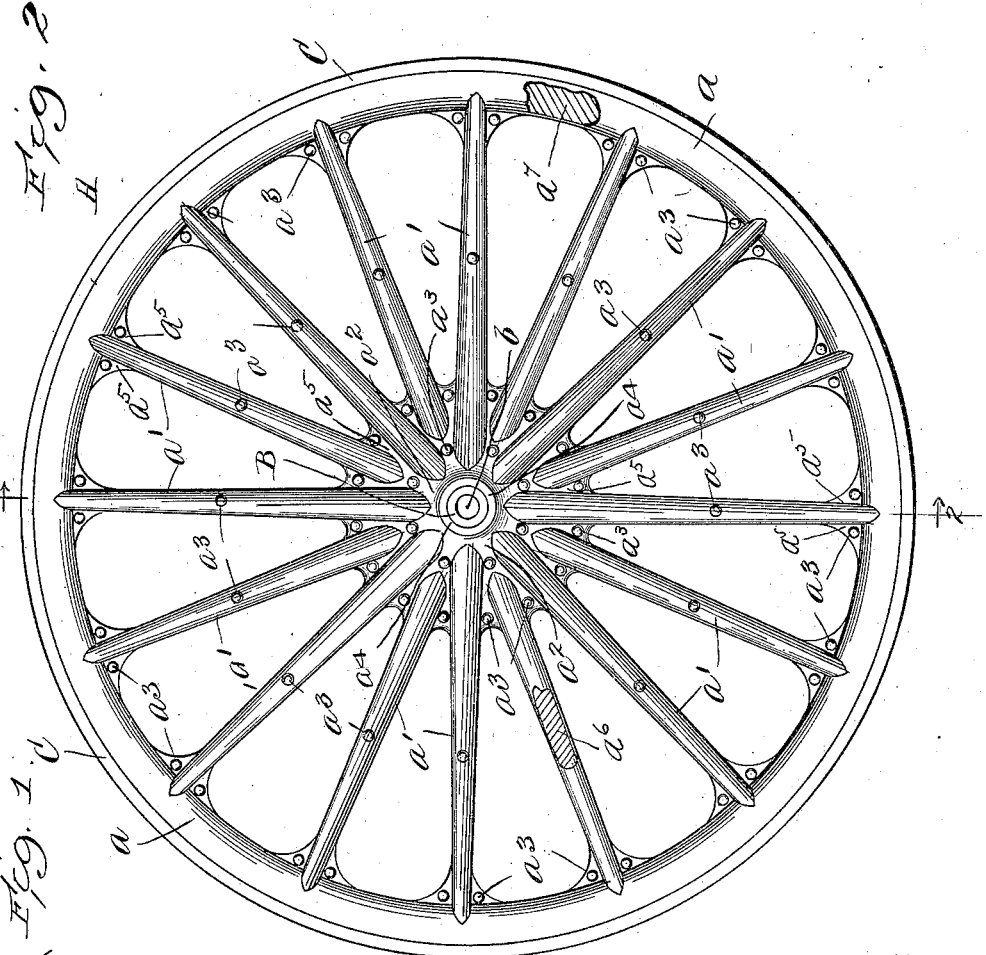

No. 744,959. Patented November 24, 1903.

UNITED STATES PATENT OFFICE.

WILLIAM DEWAR, OF JOLIET, ILLINOIS.

WHEEL.

SPECIFICATION forming part of Letters Patent No. 744,959, dated November 24, 1903.

Application filed September 15, 1902. Serial No. 123,554. (No model.)

*To all whom it may concern:*

Be it known that I, WILLIAM DEWAR, a citizen of the United States, residing in the city of Joliet, in Will county, and State of Illinois, have invented certain new and useful Improvements in Wheels, of which the following is a specification.

My invention relates to wheels, while it more particularly relates to wheels composed in the main of metal; and its object is to provide a durable wheel of comparatively small cost to manufacturer.

To this end it consists in the features of construction and combination hereinafter more fully described, and pointed out in the claims hereto annexed.

Referring to the accompanying drawings, wherein like reference-letters indicate the same or corresponding parts, Figure 1 is a side elevation of one form of my improved wheel, and Fig. 2 is a sectional view taken on the line 2 2 of Fig. 1 and viewed in the direction indicated by the arrows at the extremities of said line.

In constructing the form of my device shown in the drawings I punch or press out of sheet metal (preferably from sheet-steel) two sections of the wheel, each of which sections comprises substantially a half-section of the wheel-rim $a$, spokes $a'$, and hub receiving and shielding sockets or members $a^2$. When the two sections above referred to have been formed in the manner described, the hub proper, B, may be inserted between the hub-receiving members $a^2$, and the flat or substantially flat surfaces $a^5$, designed to abut against each other, may be brought together in such manner as to completely form hollow spokes and rim and hub-retaining means $a^2$. Following this the sections may be rigidly secured to each other by any suitable means, as by the bolts or rivets $a^3$ or by brazing them together. The wheel-rim $a$ is so formed that its peripheral flanges come together edge to edge and form an approximately cylindrical surface, which constitutes an uninterrupted bearing-surface for the tire C. When the wheel parts have been secured together, said tire is fastened to and about the rim portions $a$ to hold them firmly together.

In Fig. 2 the tire C is shown as slightly concaved on its inner face to receive in said concavity the face $a$ of the rim. This form of tire may be "sweated" or otherwise suitably adjusted upon the rim. The members $a^2$ are provided at their outer extremities with substantially annular flanges $a^4$, and the extremities of the hub are scored to receive said flanges.

It is apparent that, if desired, spokes $a^6$, of wood or of any suitable material, may be inserted within the hollow spokes $a'$, that a rim $a^7$, of wood or of any suitable material, may be inserted within the hollow rim $a$, and that the number, size, and form of the various parts of my improved device may be greatly varied without departing from the principle of the invention.

Having thus described my invention, what I claim as new, and desire to secure by Letters Patent, is—

1. A wheel, comprising a hub; a tire; a web; a hub-receiving member; and a wheel-rim formed by pressing or stamping said members in two pieces from sheet metal and thereafter securing said pieces to each other, the peripheral flanges of said wheel-rim coming together edge to edge and forming an uninterrupted and approximately cylindrical bearing-surface for supporting said tire; and said tire being fastened to and about said rim portions to thereby hold the same firmly together.

2. A wheel comprising a web; a hub-receiving member as $a^2$ provided at its outer extremity with the substantially annular flanges $a^4$, and a wheel-rim formed by pressing or stamping said members in two pieces from sheet metal and thereafter securing said pieces to each other; a tire; and a hub, the extremities whereof are scored to receive said flanges.

WILLIAM DEWAR.

Witnesses:
CHARLES S. HILL,
H. Y. MICHAELSON.